(12) United States Patent
Kurihara

(10) Patent No.: US 6,272,116 B1
(45) Date of Patent: Aug. 7, 2001

(54) POWER SAVING DEVICE

(75) Inventor: Kazuhiro Kurihara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/104,372

(22) Filed: Jun. 25, 1998

(30) Foreign Application Priority Data

Jun. 27, 1997 (JP) .................................................. 9-171899

(51) Int. Cl.[7] .................................................. H04B 7/26
(52) U.S. Cl. .......................... 370/311; 455/38.3; 455/574
(58) Field of Search ........................... 370/311; 499/38.3, 499/522, 574

(56) References Cited

FOREIGN PATENT DOCUMENTS

| | | |
|---|---|---|
| 61-240719 | 10/1986 | (JP) . |
| 3-187622 | 8/1991 | (JP) . |
| 4-120920 | 4/1992 | (JP) . |
| 5-130012 | 5/1993 | (JP) . |
| 6-232797 | 8/1994 | (JP) . |
| 6-252798 | 9/1994 | (JP) . |
| 6-276114 | 9/1994 | (JP) . |
| 7-95144 | 4/1995 | (JP) . |
| 8-56248 | 2/1996 | (JP) . |
| 8-172389 | 7/1996 | (JP) . |
| 8-172672 | 7/1996 | (JP) . |
| 9-74384 | 3/1997 | (JP) . |

*Primary Examiner*—Melvin Marcelo
(74) *Attorney, Agent, or Firm*—Sughrue, Mion, Zinn, Macpeak & Seas, PLLC

(57) ABSTRACT

A power saving device of the present invention includes a first demodulation circuit for selectively demodulating modulated signals derived from at least two different systems. A second demodulation circuit demodulates only one of the modulated signals. A detection circuit detects a control signal out of any one of the modulated signals. A controller selects, based on the control signal detected by the detection circuit, either one of the first and second demodulation circuits while deactivating the other demodulation circuit. The device is capable of saving power during receipt of an FM (Frequency Modulation) modulated signal and preventing communication quality from being lowered when signal strength is low.

8 Claims, 4 Drawing Sheets

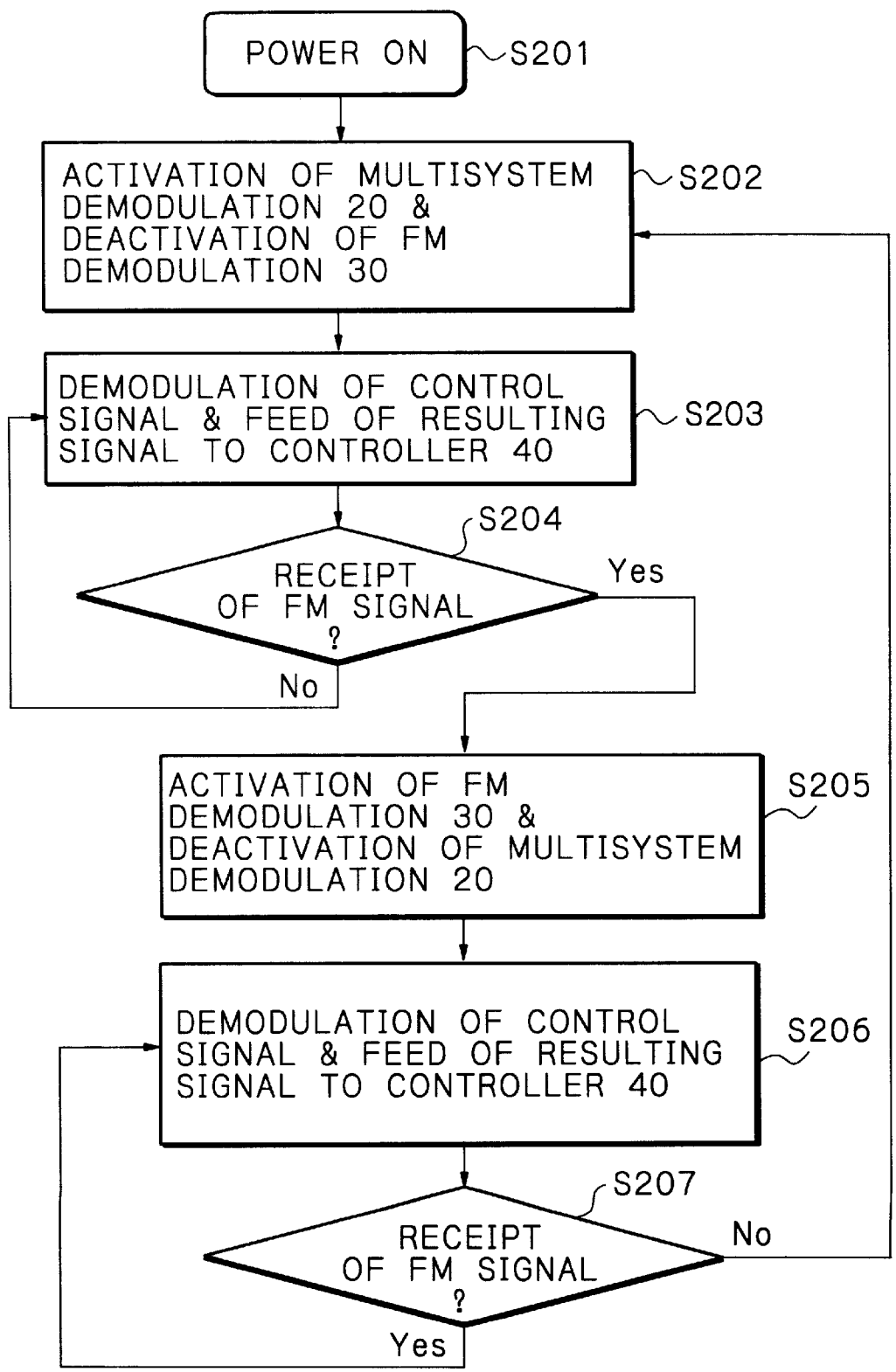

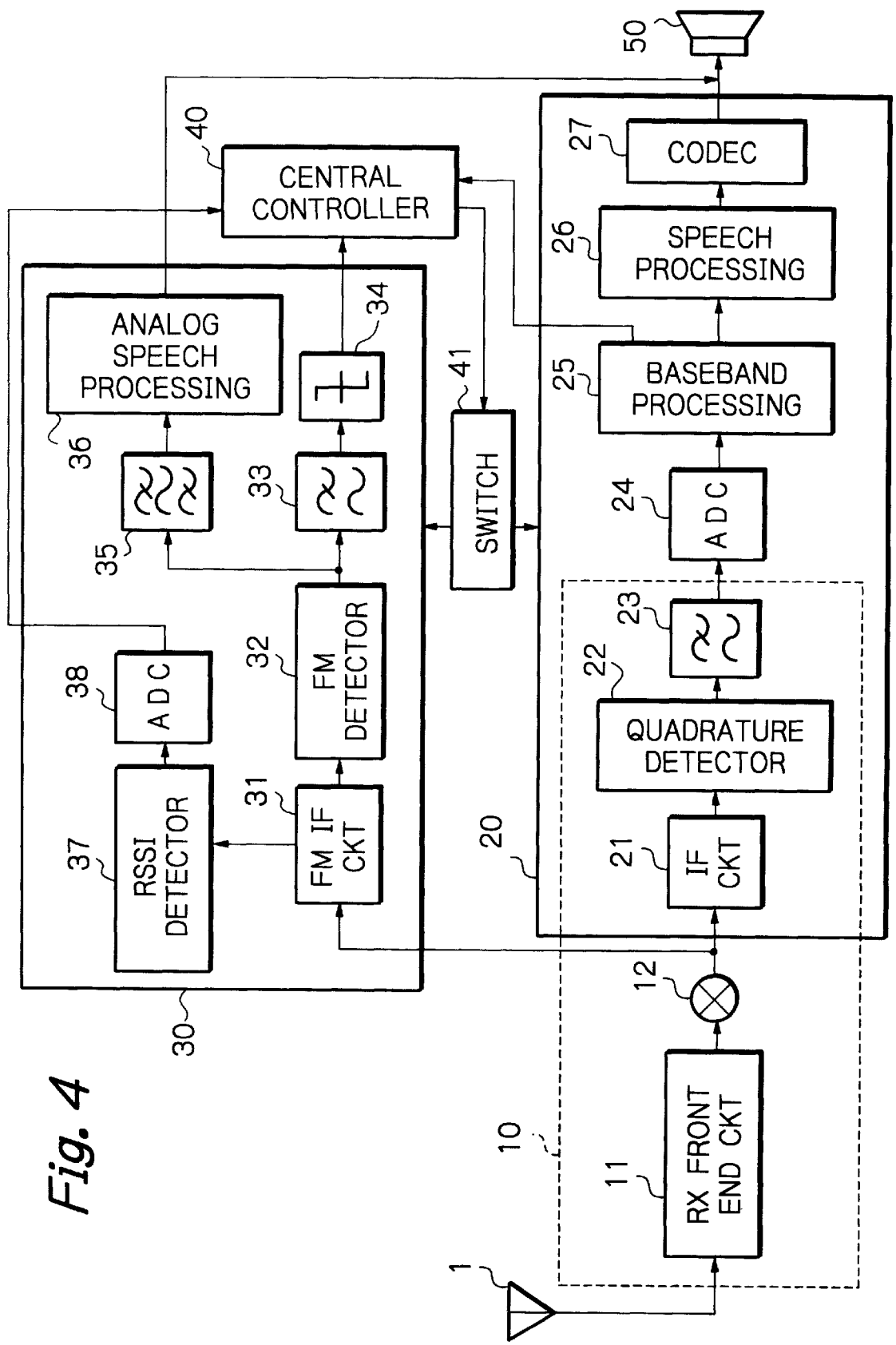

POWER SAVING DEVICE

BACKGROUND OF THE INVENTION

The present invention relates to a power saving device and, more particularly, to a power saving device applicable to a receiver of the type demodulating an FM (Frequency Modulation) signal.

It is a common practice with a portable telephone or similar miniature battery-powered portable electronic apparatus to use circuitry for reducing power consumption. A portable telephone, for example, is so constructed as to lower clock frequency while the telephone is in a stand-by state, as taught in Japanese Patent Laid-Open Publication No. 6-232797 by way of example.

However, even in the stand-by state, the above conventional telephone processes a control signal demodulated from a signal with a DSP (Digital Signal Processor). The DSP consumes substantial power even when the clock frequency is lowered, obstructing power saving in the stand-by state. In addition, a high frequency demodulation circuit used during conversation is used in the stand-by state also. Therefore, the demodulation circuit would aggravate power consumption in the stand-by state if provided with an quadrature detector and an AGC (Auto Gain Control) amplifier.

Technologies relating to the present invention are also disclosed in, e.g., Japanese Patent Laid-Open Publication Nos. 4-120920, 5-130012, 6-252798, 7-95144, 8-56248, 8-172389, and 8-172672.

SUMMARY OF THE INVENTION

It is therefore an object of the present invention to provide a power saving device capable of reducing power consumption in an FM signal waiting state.

It is another object of the present invention to provide a power saving device capable of reducing the power consumption of a receiver of the type receiving signals derived from a plurality of systems.

A power saving device of the present invention includes a first demodulation circuit for selectively demodulating modulated signals derived from at least two different systems. A second demodulation circuit demodulates only one of the modulated signals. A detection circuit detects a control signal out of any one of the modulated signals. A controller selects, based on the control signal detected by the detection circuit, either one of the first and second demodulation circuits while deactivating the other demodulation circuit.

BRIEF DESCRIPTION OF THE DRAWINGS

The above and other objects, features and advantages of the present invention will become apparent from the following detailed description taken with the accompanying drawings in which:

FIG. 3 is a flowchart demonstrating a specific operation of the illustrative embodiment; and FIG. 4 is a schematic block diagram showing an alternative embodiment of the present invention.

In the figures, identical references denote identical structural elements.

DESCRIPTION OF THE PREFERRED EMBODIMENTS

Figure 1:
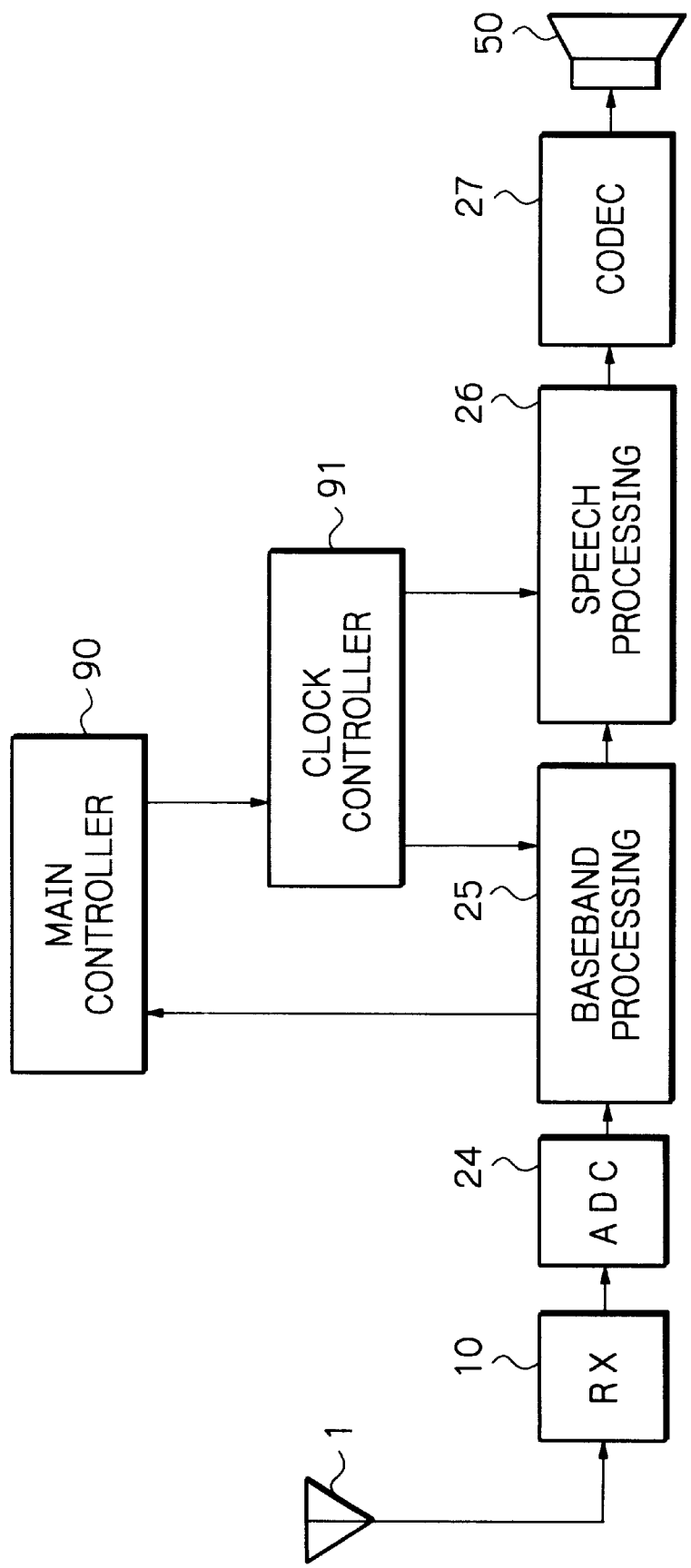
FIG. 1 is a block diagram schematically showing a conventional portable telephone.

To better understand the present invention, brief reference will be made to a conventional portable telephone, particularly a receipt line thereof, shown in FIG. 1. As shown, a radio signal coming in through an antenna 1 is demodulated by a high frequency demodulation (RX) 10 including a receiver section. The demodulated signal is transformed to a digital signal by an analog-to-digital converter (ADC) 24. A baseband processing 25 processes the digital demodulated signal output from the ADC 24 so as to decode a control signal for controlling conversation as well as call origination and call incoming. The decoded control signal is fed to a main controller 90 implemented as a CPU (Central Processing Unit). While conversation is under way, the baseband processing 25 down-samples a speech signal and feeds the sampled speech signal to a speech processing 26.

The baseband processing 25 and speech processing 26 each is implemented by a DSP or a gate array. The speech processing 26 executes, during conversation, processing necessary for expanding the speech signal output from the baseband processing 25, but does not execute any processing in a stand-by state. The speech signal output from the speech processing 26 is transformed to a speech wave by a Codec 27 and then output via a speaker 50.

The main controller 90 distinguishes the stand-by state and the conversation state on the basis of the control signal fed from the baseband processing 25. A clock controller 91 delivers a particular operation clock to each of the baseband processing 25 and speech processing 26. The clock controller 91 controls the frequencies of the clocks in accordance with the result of decision output from the main controller 90. During conversation, the main controller 90 causes the clock controller 91 to control each of the clocks assigned to the baseband processing 25 and speech processing 26 to a preselected frequency. In the stand-by state, the main controller 90 causes the clock controller 91 to lower the frequency of the clock assigned to the baseband processing 25 below the frequency for conversation and to interrupt the clock assigned to the speech processing 26. With this configuration, it is possible to reduce the power consumption of the telephone.

However, even in the stand-by state, the above telephone processes the demodulated control signal with the DSP. The DSP consumes substantial power even when the clock frequency is lowered, obstructing power saving in the stand-by state, as discussed earlier. In addition, the RX 10 used during conversation is used in the stand-by state also. Therefore, the RX 10 would aggravate power consumption in the stand-by state if provided with an quadrature detector and an AGC amplifier.

Figure 2:
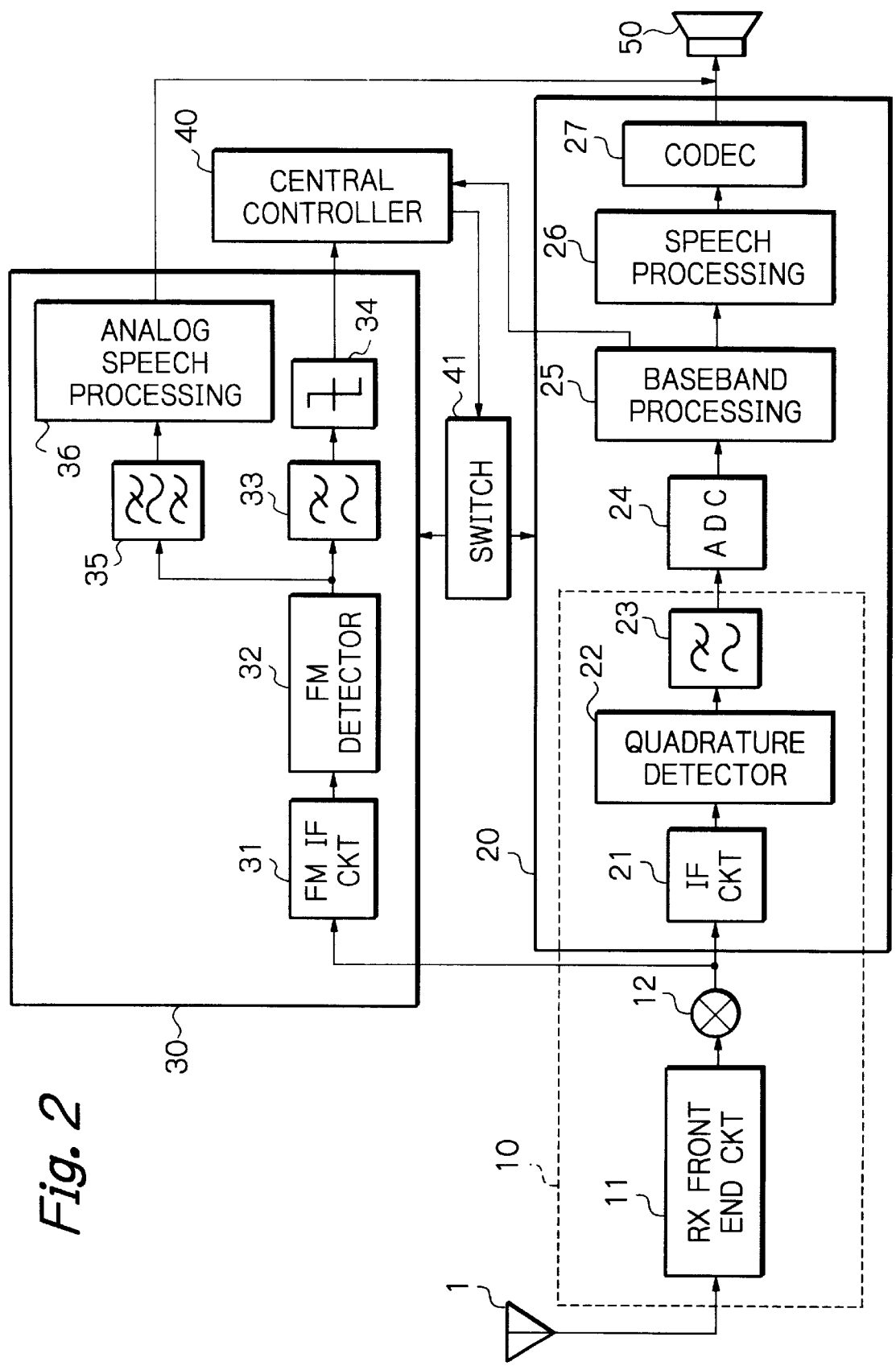
FIG. 2 is a block diagram schematically showing a power saving device embodying the present invention.

Referring to FIG. 2, a portable telephone, particularly a receipt line thereof, to which a power saving device embodying the present invention is applied is shown. A transmission line also included in the telephone will not be described because it is not relevant to the understanding of the present invention. Of course, the illustrative embodiment is applicable not only to a portable telephone but also to any other communication apparatus.

As shown in FIG. 2, the power saving device includes a first and a second demodulation 20 and 30, respectively. The first and second demodulations 20 and 30 should preferably be implemented as a multisystem demodulation circuit and an FM demodulation circuit, respectively. The multisystem demodulation circuit is capable of demodulating modulated signals derived from different systems while the FM modulation circuit is exclusively assigned to an FM signal. In the illustrative embodiment, the first modulation 20 should preferably be applicable to at least an FM signal and a CDMA (Code Division Multiple Access) signal. The power saving device additionally includes an antenna 1, a receiver (RX) front end circuit 11, a frequency converter 12, a switch 41 for selecting either one of the two demodulations 20 and 30, a central controller 40 for selecting either one of the demodulations 20 and 30 and controlling the switch 41, and a speaker 50 for outputting a speech.

The multisystem demodulation 20 includes an IF (Intermediate Frequency) circuit 21 to which an IF signal lying in the IF band is fed from the frequency converter 12. The IF circuit 21 includes a channel filter, IF amplifier, and an AGC amplifier for filtering out signals outside of the channel band and adjusting the level of a desired signal, although not shown specifically. A quadrature detector 22 executes quadrature detection with the IF signal output from the IF circuit 21 and delivers the detected IF signal to an ADC 24 via a low pass filter 23. The ADC 24 converts the detected input IF signal to a corresponding digital signal.

The IF circuit 21, quadrature detector 22 and low pass filter 23 included in the multisystem demodulation 20, the RX front end circuit 11 and frequency converter 12 constitute a high frequency demodulation (RX) 10 in combination, as indicated by a dashed block. In the illustrative embodiment, the RX 10 is implemented by a single stage superheterodyne system, as illustrated. Alternatively, a frequency conversion circuit may be built in the IF circuit 21 in order to construct a multistage superheterodyne system.

The digital signal output from the ADC 24 is fed to a baseband processing 25. The baseband processing 25 decodes a control signal necessary for conversation and call origination and call incoming and delivers the decoded control signal to the central controller 40 implemented as a CPU. While conversation is under way, the baseband processing 25 down-samples a speech signal and feeds the sampled speech signal to a speech processing 26. The speech processing 26 expands the speech signal output from the baseband processing 25 while executing other conventional processing. The speech signal output from the speech processing 26 is transformed to a speech wave by a Codec 27 and then output via a speaker 50. The baseband processing 25 and speech processing 26 each is implemented by a DSP or a gate array.

The IF circuit 21, quadrature detector 22, low pass filter 23, ADC 24, baseband processing 25, speech processing 26 and Codec 27 constitute the multisystem demodulation 20 in combination.

On the other hand, the FM demodulation 30 is made up of an FM IF circuit 31, an FM detector 32, a low pass filter 33 for demodulating a control signal, a comparator 34, a band pass filter 35 for demodulating the speech signal, and an analog speech processing 36. The FM IF circuit 31 includes a channel filter, an IF amplifier and a limiter for amplifying the IF signal output from the frequency converter 12 while limiting its amplitude, although not shown specifically. The FM IF circuit 31 may include a frequency conversion circuit in order to construct a plurality of IF stages. The FM detector 32 demodulates the IF signal output from the FM IF circuit 31 by, e.g., quadrature detection or discriminator detection.

The control signal contained in the FM signal is routed through the low pass filter 33 to the comparator 34. The comparator 34 executes binary decision with the input control signal, preferably wide band data contained therein, and feeds the result of decision to the central controller 40. The speech signal is routed through the band pass filter 35 to the analog speech processing 36. The analog speech processing 36 executes various kinds of conventional processing with the input speech signal, e.g., deemphasis and expansion. The processed speech signal is output via the speaker 50.

The central controller 40 determines, based on the output of the comparator 34 or that of the baseband processing 25, whether or not a signal to follow is an FM modulated signal or a digital modulated signal. The central controller 40 delivers a system detection signal representative of the result of decision to the switch 41.

The switch 41 selects either the FM demodulation 30 or the multisystem demodulation 20 in response to the system detection signal fed from the central controller 40. Specifically, when a signal to follow is an FM signal, the switch 41 maintains the various blocks constituting the FM demodulation 30 active or activates them if they are inactive. At the same time, the switch 41 interrupts the operation of or the power supply to the various blocks constituting the multisystem demodulation 20. On the other hand, when a signal to follow is a CDMA or similar digital modulated signal, the switch 41 maintains the various blocks constituting the multisystem demodulation 20 active or activates them if they are inactive. At the same time, the switch 41 interrupts the operation of or the power supply to the various blocks constituting the FM demodulation 30.

A specific operation of the above embodiment will be described with reference to FIG. 3. As shown, when a power switch, not shown, provided on the portable telephone is turned on (step S201), power is fed to the entire circuitry of the telephone except for the FM demodulation 30. That is, the entire circuitry other than the FM demodulation 30 starts operating (step S202). The multisystem demodulation 20 is therefore selected at the time of power-up. While this selection should preferably be done by the central controller 40, it depends on a prescribed rule particular to the system. Specifically, the system including the above portable telephone prescribes which demodulation circuit or which signal should be used first.

A received signal, i.e., an FM signal or a CDMA signal preferably sent from a base station is demodulated by the multisystem demodulation 20. This demodulation 20 is adaptive to at least two different kinds of modulated signals. A control signal contained in the demodulated signal is fed from the baseband processing 25 to the central controller 40 (step S203). The control signal contains information indicating whether the received signal is a signal to be continuously dealt with by the multisystem demodulation circuit 20, preferably a CDMA signal, or whether it is an FM signal to be dealt with by the FM demodulation 30. The central controller 40 determines, based on the output of the baseband processing 25, whether or not a signal to follow is an FM signal (step S204). If the answer of the step S204 is negative (No), meaning that a signal to follow is a CDMA signal, then the multisystem demodulation 20 demodulates the received signal while feeding the control signal to the central controller 40.

If the answer of the step S204 is positive (Yes), meaning that a signal to follow is an FM modulated signal, then the central controller 40 delivers the previously mentioned system detection signal to the switch 41. In response, the switch 41 activates the FM demodulation 30 and deactivates the multisystem demodulation 20 in order to minimize power consumption (step S205). In this condition, the FM demodulation 30 demodulates the FM modulated signal coming in through the antenna 1. The comparator 34 performs binary decision with wide band data contained in the control signal of the FM signal (step S206). The central controller 40 determines, based on the result of decision output from the comparator 34, whether the FM modulated signal will appear continuously or whether it will be replaced with a CDMA signal (step S207). If the answer of the step S207 is Yes, then the steps S206 and S207 are repeated.

If the answer of the step S207 is No, meaning that the FM modulated signal will be replaced with a CDMA signal, then the central controller 40 sends another system detection signal to the switch 41. In response, the switch 41 activates the multisystem demodulation 20 and deactivates the FM demodulation 30 in order to minimize power consumption (step S202).

As stated above, during receipt of an FM modulated signal, the illustrative embodiment deactivates the multisystem demodulation 20 adaptive to both of an FM demodulated signal and a CDMA signal and consuming much current, while activating the FM demodulation 30 consuming little current. This successfully saves power during receipt of an FM modulated signal.

Reference will be made to FIG. 4 for describing an alternative embodiment of the present invention. This embodiment is similar to the previous embodiment except for the following. As shown, the FM demodulation 30 includes an RSSI (Received Signal Strength Indicator) detector 37 and an ADC 38 in addition to the constituents shown in FIG. 2.

The RSSI detector 37 detects an RSSI out of the output of the IF amplifier included in the FM IF circuit 31 and outputs an RSSI voltage. The ADC 38 digitizes the RSSI voltage received from the RSSI detector 37. The resulting digital output of the ADC 38 is fed to the central controller 40. In response, the central controller 40 determines channel quality. If the channel quality is low, preferably if the level of the digital signal is lower than a preselected level, the controller 40 causes the switch 41 to select the multisystem demodulation 20.

Specifically, higher communication quality is achievable with the multisystem demodulation 20, preferably adaptive to both of an FM signal and a CDMA signal, than with the FM demodulation 30, depending on the baseband processing method. In such a case, if the RSSI level detected out of the received signal is lower than the preselected level, the central controller 40 selects the multisystem demodulation 20 in place of the FM demodulation 30 via the switch 41. An FM modulated signal received thereafter is demodulated by the multisystem demodulation 20 unless a switching signal is output.

With the above alternative embodiment, it is possible to prevent communication quality from being lowered even when signal strength is low. If desired, the RSSI detected for control may be replaced with an error rate.

In summary, it will be seen that the present invention provides a power saving device capable of saving power during receipt of an FM modulated signal and preventing communication quality from being lowered when signal strength is low. These unprecedented advantages are derived from a unique configuration in which during receipt of an FM modulated signal, a multisystem demodulation circuit including a quadrature detector and a DSP and consuming much current is deactivated, allowing the signal to be demodulated by an FM demodulation circuit consuming little current.

Various modifications will become possible for those skilled in the art after receiving the teachings of the present disclosure without departing from the scope thereof.

What is claimed is:

1. A power saving device comprising:

first demodulating means for selectively demodulating modulated signals derived from at least two different systems;

second demodulating means for demodulating only one of the modulated signals;

detecting means for detecting a control signal out of any one of the modulated signals; and control means for selecting, based on the control signal detected by said detecting means, either one of said first demodulating means and said second demodulating means while deactivating the other demodulating means.

2. A power saving device as claimed in claim 1, wherein said first demodulating means and said second demodulating means are connected to a single high frequency receiving means to which the modulated signals are input.

3. A power saving device as claimed in claim 1, wherein said first demodulating means comprises a first demodulation circuit for selectively demodulating an FM modulated signal and a CDMA signal while said second demodulating means comprises a second demodulation circuit for demodulating only an FM modulated signal.

4. A power saving device as claimed in claim 1, wherein said first demodulating means consumes more power than said second demodulating means, said second demodulating means including an FM detector.

5. A power saving device as claimed in claim 4, wherein said first demodulating means includes one of a gate array and a DSP.

6. A power saving device as claimed in claim 5, wherein said first demodulating means includes a quadrature detector.

7. A power saving device as claimed in claim 4, further comprising comparing means following said FM detector for detecting a signal used to select either one of said first demodulating means and said second demodulating means.

8. A power saving device as claimed in claim 1, wherein said second demodulating means includes sensing means for sensing channel quality, said control means selecting either one of said first demodulating means and said second demodulating means in response to an output of said sensing means.

* * * * *